(12) United States Patent
McDowall et al.

(10) Patent No.: US 12,231,399 B2
(45) Date of Patent: Feb. 18, 2025

(54) DISTRIBUTED TRAFFIC STEERING AND ENFORCEMENT FOR SECURITY SOLUTIONS

(71) Applicant: Palo Alto Networks, Inc., Santa Clara, CA (US)

(72) Inventors: John Edward McDowall, Redwood City, CA (US); Nilesh Bansal, Santa Clara, CA (US); Sharad Saha, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 346 days.

(21) Appl. No.: 17/684,299

(22) Filed: Mar. 1, 2022

(65) Prior Publication Data
US 2022/0385631 A1 Dec. 1, 2022

Related U.S. Application Data (63) Continuation-in-part of application No. 17/246,160, filed on Apr. 30, 2021, now Pat. No. 11,665,139.

(51) Int. Cl.
*H04L 9/40* (2022.01)

(52) U.S. Cl.
CPC ...... *H04L 63/0218* (2013.01); *H04L 63/0227* (2013.01); *H04L 63/1433* (2013.01)

(58) Field of Classification Search
CPC ............. H04L 63/0218; H04L 63/0227; H04L 63/1433; H04L 63/0236
See application file for complete search history.

(56) References Cited

U.S. PATENT DOCUMENTS

| | | |
|---|---|---|
| 8,612,612 B1 | 12/2013 | Dukes |
| 10,374,871 B2 | 8/2019 | Ramachandran |
| 11,140,455 B1 | 10/2021 | Woodruff |
| 11,929,987 B1 | 3/2024 | Pranavadatta |
| 2004/0193943 A1 | 9/2004 | Angelino |
| 2014/0122435 A1 | 5/2014 | Chavda |

(Continued)

FOREIGN PATENT DOCUMENTS

| | | |
|---|---|---|
| CN | 107959614 | 11/2020 |
| EP | 2933963 | 4/2018 |
| WO | 2003025766 | 3/2003 |

OTHER PUBLICATIONS

Author Unknown, Generic Flow API (rte_flow)—Data Plane Development Kit 21.05.0-rc1 documentation, downloaded Apr. 22, 2021.

(Continued)

*Primary Examiner* — Huan V Doan
(74) *Attorney, Agent, or Firm* — Van Pelt, Yi & James LLP (57) ABSTRACT

Techniques for distributed traffic steering and enforcement for security solutions are disclosed. In some embodiments, a system, process, and/or computer program product for distributed traffic steering and enforcement for security solutions includes encapsulating an original traffic header for a monitored flow from/to a host or a container; rerouting the flow from the host or the container to a security platform of a security service; performing security analysis at the security platform using the original traffic header; and rerouting the flow back to the host or the container for routing to an original destination based on the original traffic header.

20 Claims, 7 Drawing Sheets

(56) References Cited

U.S. PATENT DOCUMENTS

| | | | |
|---|---|---|---|
| 2016/0149863 A1 | 5/2016 | Walker | |
| 2016/0269371 A1 | 9/2016 | Coimbatore | |
| 2016/0342801 A1 | 11/2016 | Sreekanti | |
| 2018/0063195 A1 | 3/2018 | Nimmagadda | |
| 2019/0012162 A1 | 1/2019 | Vaikar | |
| 2019/0053308 A1 | 2/2019 | Castellanos Zamora | |
| 2019/0068641 A1 | 2/2019 | Araujo | |
| 2019/0394170 A1 | 12/2019 | Shameli-Sendi | |
| 2020/0059992 A1 | 2/2020 | Skog | |
| 2020/0128399 A1 | 4/2020 | Verma | |
| 2020/0274852 A1 | 8/2020 | Ahmed | |
| 2020/0396164 A1 | 12/2020 | Arimanda | |
| 2020/0412755 A1* | 12/2020 | Jing | H04L 43/026 |
| 2021/0271777 A1 | 9/2021 | Netsch | |
| 2022/0224706 A1* | 7/2022 | Peng | H04L 49/208 |
| 2023/0262076 A1 | 8/2023 | Gechman | |

OTHER PUBLICATIONS

Github, sessionOffload/GeneveOpenOffload.md at master-att/sessionOffload, downloaded Apr. 21, 2021.
Github, sessionOffload/openoffload.proto at v1beta1-att/sessionOffload, Apr. 30, 2021.
Gross et al., RFC 8926—Geneve: Generic Network Virtualization Encapsulation, Internet Engineering Task Force (IETF), Nov. 2020.
NVIDIA, NVIDIA Mellanox Bluefield-2, Data Processing Unit (DPU), Product Brief, Aug. 2020.
Palo Alto Networks, APP-ID, Technology Brief, pp. 1-5, downloaded Apr. 21, 2021.
Thaler et al., Making eBPF Work on Windows, Microsoft Open Source Blog, (https://cloudblogs.microsoft.com/opensource/), May 10, 2021.
ETSI, ETSI GS MEC 013 V3.1.1 (Jan. 2023), Group Specification, Multi-access Edge Computing (MEC); Location API.
ETSI, ETSI TS 129 571 V16.6.0 (Jan. 2021), Technical Specification, 5G; 5G System; Common Data Types for Service Based Interfaces; Stage 3, (3GPP TS 29.571 version 16.6.0 Release 16).
ETSI, ETSI TS 129 572 V16.6.0 (Apr. 2021), Technical Specification, 5G; 5G System; Location Management Services; Stage 3 (3GPP TS 29.572 version 16.6.0 Release 16).
Github, cni/SPEC.md at Master, containernetworking/cni, Container Network Interface (CNI) Specification, downloaded May 18, 2021.
Istio, Istio Security, downloaded May 18, 2021.
Kubernetes, Network Plugins, downloaded May 18, 2021.
Mallu et al., Maintaining Transport Layer Security All the Way to Your Container: Using the Application Load Balancer with Amazon ECS and Envoy, May 29, 2020, pp. 1-22.
Park et al., Core Container Security Frameworks, International Journal of Advanced Research in Engineering and Technology (IJARET), vol. 11, Issue 6, Jun. 2020, pp. 1024-1038.
Wikipedia, Bump-in-the-Wire, page last edited Sep. 7, 2020.
Ivanov Konstantin, Containerization with LXC, Feb. 1, 2017.
Nam et al., Bastion: A Security Enforcement Network Stack for Container Networks, USENIX, the Advanced Computing Systems Association, Feb. 3, 2021, pp. 1-24.

* cited by examiner

DISTRIBUTED TRAFFIC STEERING AND ENFORCEMENT FOR SECURITY SOLUTIONS

CROSS REFERENCE TO OTHER APPLICATIONS

This application is a continuation in part of U.S. patent application Ser. No. 17/246,160 entitled DISTRIBUTED OFFLOAD LEVERAGING DIFFERENT OFFLOAD DEVICES, filed Apr. 30, 2021, which is incorporated herein by reference for all purposes.

BACKGROUND OF THE INVENTION

A firewall generally protects networks from unauthorized access while permitting authorized communications to pass through the firewall. A firewall is typically a device or a set of devices, or software executed on a device, such as a computer, which provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Advanced or Next Generation Firewalls

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices, and in some implementations, certain operations can be implemented in special purpose hardware, such as an ASIC or FPGA).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein). A firewall can also filter local network (e.g., intranet) traffic by similarly applying a set of rules or policies.

Security devices (e.g., security appliances, security gateways, security services, and/or other security devices) can perform various security operations (e.g., firewall, anti-malware, intrusion prevention/detection, proxy, and/or other security functions), networking functions (e.g., routing, Quality of Service (QoS), workload balancing of network related resources, and/or other networking functions), and/or other security and/or networking related operations. For example, routing can be performed based on source information (e.g., IP address and port), destination information (e.g., IP address and port), and protocol information (e.g., layer-3 IP-based routing).

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using Hyper-Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls).

For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

Technical Challenges for Security Solutions in Increasing Bandwidth Network Environments Security service providers offer various commercially available security solutions including various firewall, VPN, and other security related services. For example, some security service providers provide their customers with such security solutions including various firewall, VPN, and other security related services. However, the increasing bandwidth network environments (e.g., enterprise network environments with 100 Gigabyte (100 G) links) present technical challenges for such security solutions.

For example, there is a need to steer network traffic from various locations (e.g., computing resources of customers of the security solution) to the security solution (e.g., firewalls, such as a cluster of firewalls located in a different computing environment, in which the security solutions can be implemented using physical, virtual, and/or container-based security solutions for commercially available Palo Alto Networks' firewalls, which can be provided, for example, using various commercial virtualized environments, including, for example, VMware® ESXi™ and NSX™, Citrix® Netscaler SDX™, KVM/OpenStack (Centos/RHEL, Ubuntu®), and Amazon Web Services (AWS) or for various other commercially available firewall solutions). Moreover, it is desired to facilitate the network traffic without requiring customers to have to redesign their enterprise networks or applications that are used by the customers (e.g., Software as a Service (SaaS) and/or other applications).

It is also desired to provide distribute an enforcement point to a steering location to increase efficiency for the security solution processing of the network traffic (e.g., which can include performing various enforcement actions, such as the following: allow, drop, bypass, offload actions, and/or other actions at the enforcement point).

Further, it is desired to steer the network traffic while also maintaining the original network traffic associated information (e.g., source/destination information associated with the network packets, such as the packet header information) to facilitate the correct application security rules based on such original network traffic associated information.

Finally, it is desired to facilitate the above-described using bare metal/physical, virtual (e.g., VM-based), and/or container (e.g., container-based) security solutions.

Overview of Techniques for Distributed Traffic
Steering and Enforcement for Security Solutions Accordingly, various techniques for providing distributed traffic steering and enforcement for security solutions are disclosed.

In some embodiments, a system, process, and/or computer program product for distributed traffic steering and enforcement for security solutions includes encapsulating an original traffic header for a monitored flow from/to a host or a container; rerouting the flow from the host or the container to a security platform (e.g., of a security service); performing security analysis at the security platform using the original traffic header; rerouting the flow back to the host or the container for routing to an original destination based on the original traffic header.

For example, the disclosed techniques for providing distributed traffic steering and enforcement for security solutions facilitate steering network traffic from various locations (e.g., computing resources of customers of the security solution) to the security solution (e.g., firewalls, such as a cluster of firewalls located in a different computing environment, in which the security solutions can be implemented using physical, virtual, and/or container-based security solutions for commercially available Palo Alto Networks' firewalls, which can be provided, for example, using various commercial virtualized environments, including, for example, VMware® ESXi™ and NSX™, Citrix® Netscaler SDX™, KVM/OpenStack (Centos/RHEL, Ubuntu®), and Amazon Web Services (AWS) or for various other commercially available firewall solutions). Moreover, the disclosed techniques facilitate the network traffic steering without requiring customers to have to redesign their enterprise networks or applications that are used by the customers (e.g., these techniques can be implemented in a manner that is transparent to the Software as a Service (SaaS) and/or other applications used by customers). Further, the disclosed techniques are not constrained by application host machine resources, which allows for independent scaling of the firewall service from applications due its distributed design as will be further described below. Also, the disclosed traffic steering techniques can be implemented using bare metal/physical, virtual (e.g., VM-based), and/or container (e.g., container-based) security solutions.

As such the disclosed techniques for traffic steering for security enforcement improves efficiency for security solutions and also facilitates enhanced security enforcement by maintaining the original network information associated with the network traffic to facilitate the correct application of security policies based on the original network information.

Specifically, the disclosed techniques for providing distributed traffic steering and enforcement for security solutions change the way traffic is steered and controlled by the security platform(s) (e.g., firewall(s)). More specifically, unlike the existing approaches of modifying the networking topology, the disclosed techniques for providing distributed traffic steering and enforcement for security solutions modify the packets (e.g., within the kernel using eBPF/XDP). Also, the disclosed techniques for providing distributed traffic steering and enforcement for security solutions can be implemented for bare metal, virtual machines, and/or containers as well as various/most Smart Network Interface Cards (SmartNICs, e.g., using a commercially available SmartNIC, such as an Nvidia® Mellanox® BlueField®-2 or another commercially available SmartNIC can be used, such as other SmartNICs that are commercially available from vendors, such as Intel, Marvel/LiquidIO, AMD/Alveo, Pensando/DSC, and/or Netronome/Agilio) (e.g., using various deployment mechanisms as will be further described below).

In an example implementation, the control of the flows at the distributed control point can be based on logic pushed (e.g., or pulled by, for example, a Linux kernel), and the behavior can be controlled by directing (e.g., rerouting) the appropriate network traffic flows to the security solution (e.g., firewall and/or another network device can be the destination of the steered network traffic). The control point maintains a distributed flow cache to enable the logic to work on flows and packets. The communication with the firewall from the distributed control point is over a network tunnel (e.g., any tunnel can be used for many cases, however, if a Geneve Tunnel, for example, is used, then additional metadata can be communicated between the control point and the firewall allowing for more complex behavior, flow policy, flow offload, flow modification, etc. as will be further described below). Also, the security solution is distributed to the end points being protected and at the end point flows, which can be controlled providing both improved scalability of the security solution (e.g., firewall) and improved latency.

As such, the disclosed techniques for providing distributed traffic steering and enforcement for security solutions facilitate distributing an enforcement point to a steering location to increase efficiency for the security solution processing of the network traffic (e.g., which can include performing various enforcement actions, such as the following: allow, drop, bypass, offload actions, and/or other actions at the enforcement point). The disclosed techniques can also reduce the load and latency (e.g., using the operating system (OS) kernel to encapsulate the network traffic can reduce the load as it is not required to make copies of the network packets, and using, for example, XDP to perform such encapsulation/decapsulation removes the Linux networking stack from such network processing operations and bypasses user space manipulation of packets such as used by existing approaches, to provide for a more efficient solution, as will be further described below).

Further, the disclosed techniques for providing distributed traffic steering and enforcement for security solutions are robust and provide for a standard approach to network traffic steering (e.g., and do not create conflicts with existing network standards and can work across large scale networking).

Moreover, the disclosed techniques for providing distributed traffic steering and enforcement for security solutions can be performed using any encapsulation format thereby allowing for deployment to any network environment.

As will also be further described below, the disclosed techniques for providing distributed traffic steering and enforcement for security solutions can be implemented using a combination of distributed lightweight tunnel creation, and the Geneve protocol enables smart agents that can distribute intelligence to the edge efficiently by using Geneve as a messaging channel (e.g., extending the security solutions to include endpoint enforcement by including in edge devices).

Further, the disclosed techniques for providing distributed traffic steering and enforcement for security solutions facilitates network traffic redirection for container-based security solutions (e.g., for a Palo Alto Networks, Inc. commercially available CN-Series implementation of a Firewall as a Service within a Kubernetes Cluster or for another commercially available container-based security solution).

Accordingly, the disclosed techniques for providing distributed traffic steering and enforcement for security solutions can be implemented using distributed software (e.g., CN-Series and/or VM-Series firewalls) or physical devices as similarly described herein. As further described below, the communication with the CN-Series and/or VM-Series firewalls can be over a network tunnel (e.g., using a Geneve tunnel or another tunnelling protocol, which enables the enforcement point to be remote from the decision point). As also further described below, the disclosed techniques for providing distributed traffic steering and enforcement for security solutions can also be implemented using a SmartNIC network device.

In an example implementation, a standard tunnel format is used for communicating with the firewalls. As an example, for network devices, an open/standard Geneve tunnel format is defined (e.g., an open offload Geneve format is available at github.com/att/sessionOffload/blob/master/doc/GeneveOpenOffload.md to allow the firewall to observe/monitor the actual source/destination traffic). This provides higher degrees of security to the distributed device(s) as will be further described below. This enables the external device (e.g., a router) to make routing decisions and transmit the ingress/egress port through the firewall back to the external device for delivery. Other information such as a VLAN ID enables differentiation of traffic by mapping, for example, a customer ID to a VLAN-ID allowed per a security policy.

As such, the disclosed techniques can be implemented to enable the distribution of a network/security policy to endpoints from a central firewall (e.g., the network/security policy can be distributed to offload devices, which can include distributed software and/or distributed physical devices).

The disclosed techniques also provide an enhanced security solution that generally does not require specific hardware. The disclosed techniques are also easy to deploy (e.g., without a requirement for unnecessarily complex deployments).

In addition, the disclosed techniques can efficiently scale from low end (e.g., using software) to high end (e.g., using network devices); for example, the disclosed techniques provide the ability to scale VM/CN-Series firewalls to several times the existing scale utilizing the same computing resources.

Accordingly, various techniques are disclosed for providing distributed traffic steering and enforcement for security solutions are disclosed as will also be further described below.

Figure 1:
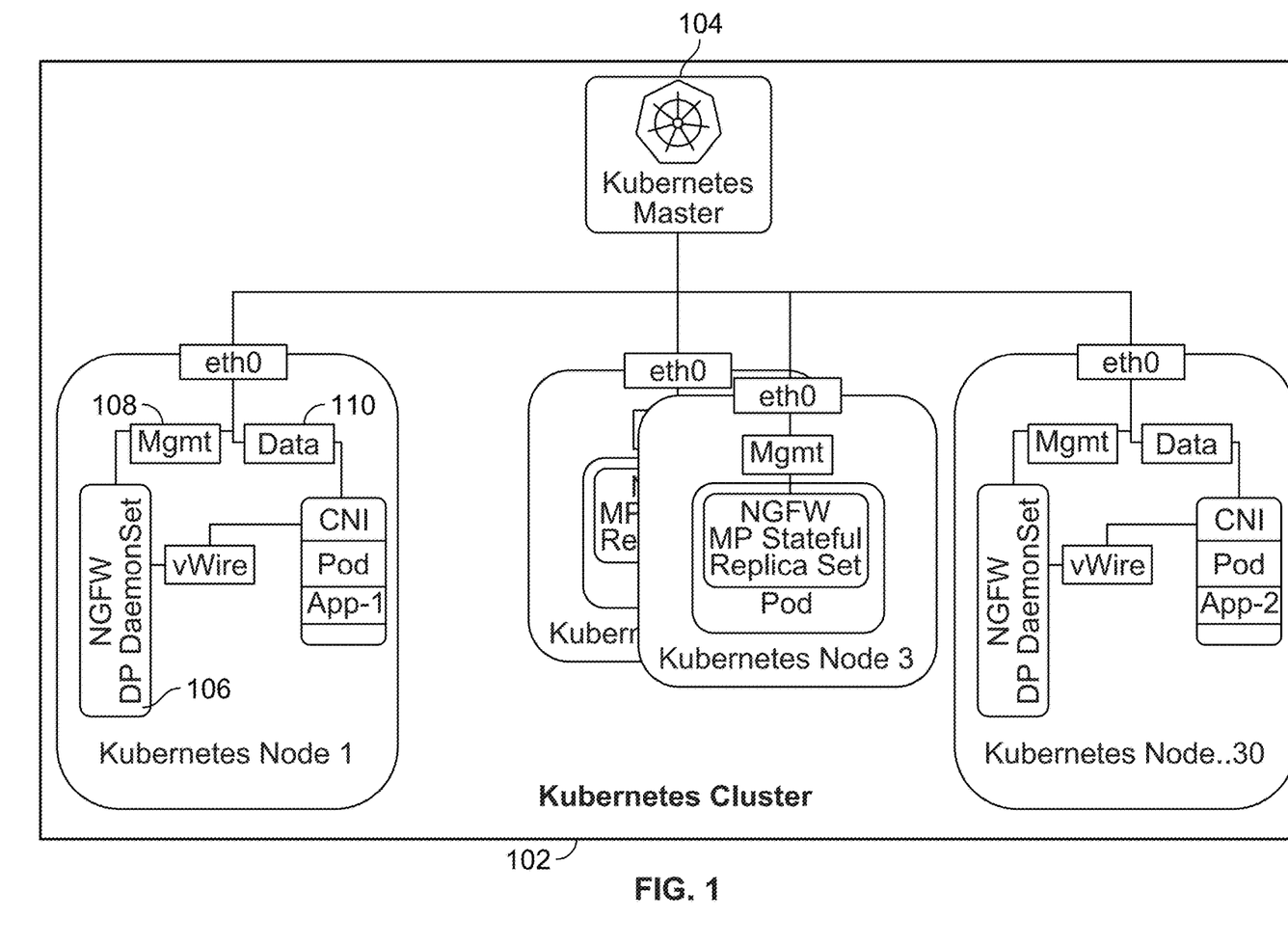
FIG. 1 is a network diagram of a system for providing distributed traffic steering and enforcement for a security solution using a container-based firewall in a Kubernetes cluster computing environment in accordance with some embodiments.

Example System Embodiments for Distributed Traffic Steering and Enforcement for Security Solutions FIG. 1 is a network diagram of a system for providing distributed traffic steering and enforcement for a security solution using a container-based firewall in a Kubernetes cluster computing environment in accordance with some embodiments. Referring to FIG. 1, the security solution includes a Kubernetes Cluster 102 that is controlled by a Kubernetes Master 104. The Kubernetes Cluster includes Kubernetes Nodes 1, 2, 3, and 30 as shown. Each Kubernetes Node includes a firewall, such as a Network Gateway FireWall (NGFW) 106.

In this example implementation, the Palo Alto Networks Container Native Firewalls (CN-Series) are natively integrated into Kubernetes (k8s) to provide complete L7 visibility, application level segmentation, DNS Security, and protection from advanced threats for traffic going across trusted zones in public cloud or data center environments. This security solution implementation can be used to isolate and protect workloads, application stacks, and services, even as individual containers scale up, down, or across hosts and consistently apply security policies that are based on Kubernetes labels, such as will be further described below.

Referring to FIG. 1, each Kubernetes Node includes a management plane (CN-MGMT), such as shown at 108, and a data plane (CN-NGFW), such as shown at 110, of the containerized firewall (e.g., separating the data and management planes can facilitate better runtime protection for applications and support a smaller footprint). The CN-MGMT and CN-NGFW can be efficiently deployed using container images and manifests (e.g., YAML manifest files with ConfigMap objects).

In this example implementation, when the security solution is deployed as a Kubernetes Service, instances of the CN-NGFW, such as shown at 106, can be deployed on any node and application pod traffic is redirected to an available CN-NGFW instance for inspection and enforcement, such as will be further described below. CN-NGFW can be deployed as a DaemonSet or as a Kubernetes Service. DaemonSet deployments are generally suited for Kubernetes environments with larger nodes, pods that require low latency, and/or require high firewall capacity. The CN-Series NGFW, which is an NGFW/firewall solution that is commercially available from Palo Alto Networks, Inc., can be deployed as a Kubernetes Service that is suited for such Kubernetes environments with smaller nodes and/or requires more dynamic firewalling.

As also shown in FIG. 1, when deployed as a DaemonSet, each instance of the CN-NGFW pod can secure 30 application pods running on the same node. This architecture enables you to place the CN-NGFW DaemonSet pod on each node that you want to protect workloads in a cluster, and a pair of CN-MGMT pods can connect to and manage up to 30 CN-NGFW pods within a cluster.

The disclosed techniques for providing distributed traffic steering and enforcement for security solutions can significantly improve flexibility, scalability, and performance for security services by, for example, reducing the compute resources (e.g., CPU and memory utilization) to facilitate higher bandwidth traffic flows on service provider or other enterprise networks. The disclosed techniques for providing distributed traffic steering and enforcement for security solutions can be implemented in Kubernetes as well as various other computing environments as will now be further described below with respect to FIGS. 2A-B and 3A-B.

Figure 2A:
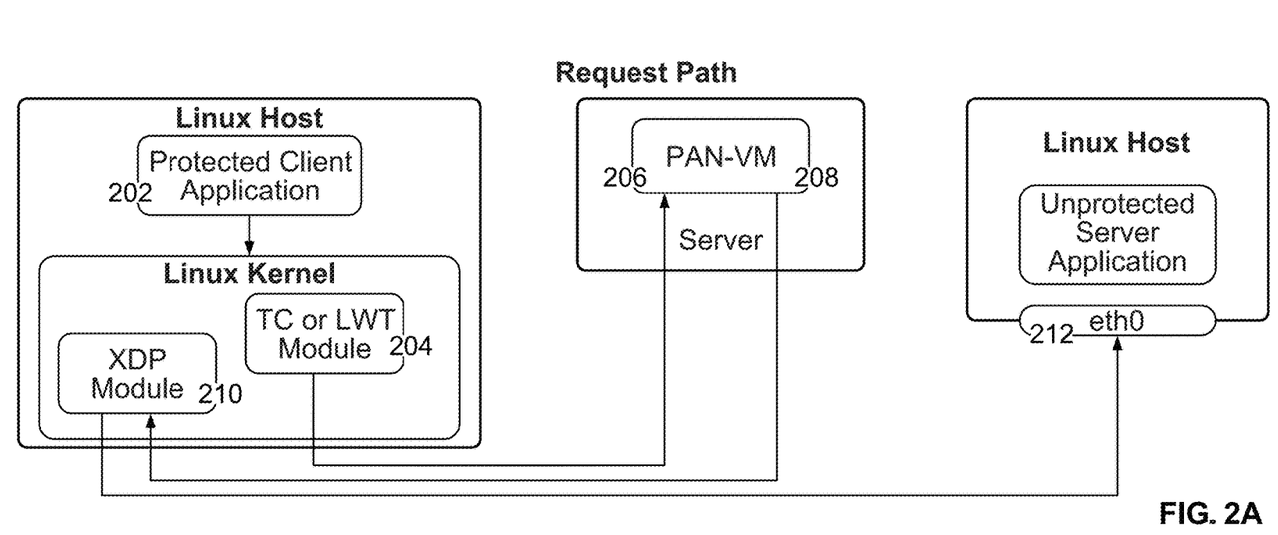
FIG. 2A is a functional block diagram of a system architecture for implementing a request path for providing distributed traffic steering and enforcement for a security solution in a generic environment in accordance with some embodiments.

FIG. 2A is a functional block diagram of a system architecture for implementing a request path for providing distributed traffic steering and enforcement for a security solution in a generic environment in accordance with some embodiments.

Referring to FIG. 2A, as an initial operation, a firewall system service is deployed in a computing environment for a security service. At stage 202, a client makes a request. At stage 204, the request is intercepted by an LWT (e.g., a lightweight tool for tunnel encapsulation) or Traffic Control (TC) extended Berkeley Packet Filter (eBPF) module in a Linux Kernel of the Linux Host, and the packet is encapsulated and addressed to be rerouted/sent to the firewall. At stage 206, the firewall receives the packet, and detects that it is an encapsulated packet so it applies the Linux Traffic Control Interface (TCI) to inspect the packet. At stage 208, the firewall swaps the source/destination (src/dst) information in the packet header and sends the packet back to the source (client application, e.g., the protected client application as shown in FIG. 2A). At stage 210, on the client, the packet is intercepted at the eBPF eXpress Data Path (XDP) layer (i.e., before the Linux networking stack), and the packet is decapsulated and sent to the original destination. At stage 212, the packet arrives at its original destination.

Figure 2B:
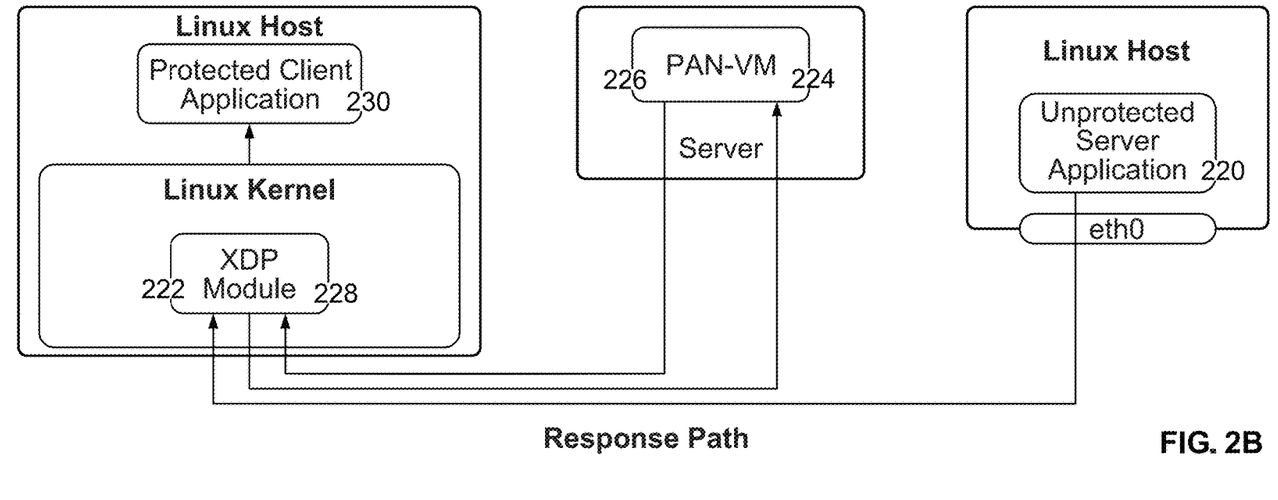
FIG. 2B is a functional block diagram of a system architecture for implementing a response path for providing distributed traffic steering and enforcement for a security solution in a generic environment in accordance with some embodiments.

FIG. 2B is a functional block diagram of a system architecture for implementing a response path for providing distributed traffic steering and enforcement for a security solution in a generic environment in accordance with some embodiments.

Referring to FIG. 2B, at stage 220, the server responds to the client. At stage 222, the response is intercepted by the XDP eBPF module in the Linux Kernel of the Linux Host, and the packet is encapsulated and addressed to be rerouted/sent to the firewall. At stage 224, the firewall receives the packet, and the firewall detects that the packet is an encapsulated packet so it applies TCI to inspect the packet. At stage 226, the firewall swaps the source/destination (src/dst) information in the packet header and sends the packet back to the source (client application). At stage 228, on the client, the packet is intercepted at the eBPF XDP layer (i.e., before the Linux networking stack), and the packet is decapsulated and as the destination is the client, it is forwarded to the client application (e.g., the protected client application as shown in FIG. 2B). At stage 230, the packet arrives at the client destination.

Figure 3A:
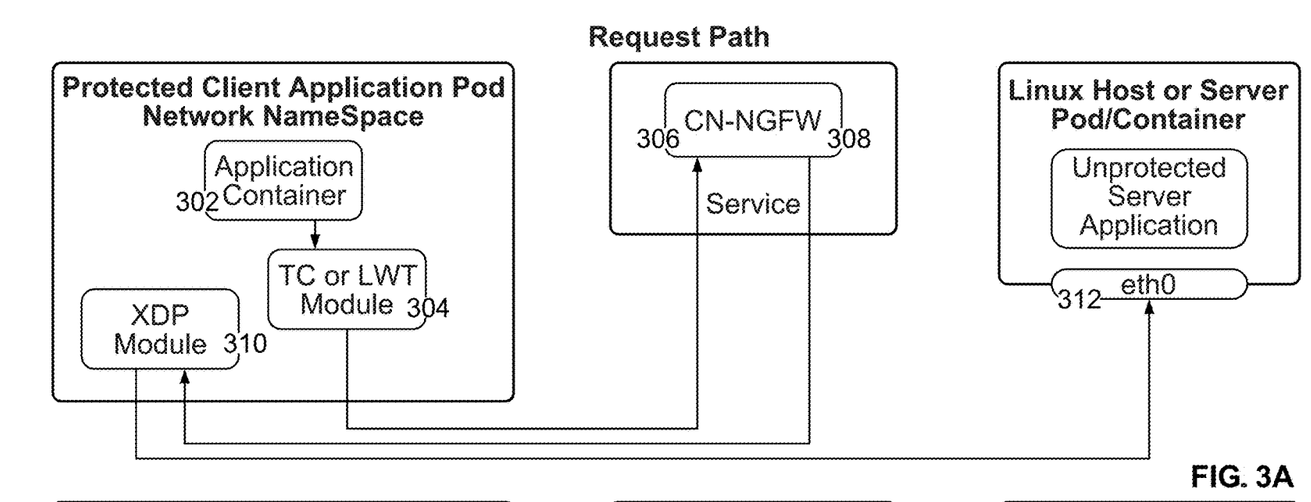
FIG. 3A is a functional block diagram of a system architecture for implementing a request path for providing distributed traffic steering and enforcement for a security solution in a Kubernetes environment in accordance with some embodiments.

FIG. 3A is a functional block diagram of a system architecture for implementing a request path for providing distributed traffic steering and enforcement for a security solution in a Kubernetes environment in accordance with some embodiments.

Referring to FIG. 3A, as an initial operation, a firewall system service is deployed in a computing environment for a security service. At stage 302, a client makes a request. At stage 304, the request is intercepted by an LWT (e.g., a lightweight tool for tunnel encapsulation) or Traffic Control (TC) extended Berkeley Packet Filter (eBPF) module in the client network namespace (e.g., Protected client application Pod Network NameSpace as shown in FIG. 3A), and the packet is encapsulated and addressed to be rerouted/sent to the firewall. At stage 306, the firewall receives the packet, and detects that it is an encapsulated packet so it applies the Linux Traffic Control Interface (TCI) to inspect the packet. At stage 308, the firewall swaps the source/destination (src/dst) information in the packet header and sends the packet back to the source (client application, e.g., the Application container as shown in FIG. 3A). At stage 310, on the client, the packet is intercepted at the eBPF eXpress Data Path (XDP) layer (i.e., before the Linux networking stack), and the packet is decapsulated and sent to the original destination. At stage 312, the packet arrives at its original destination.

Figure 3B:
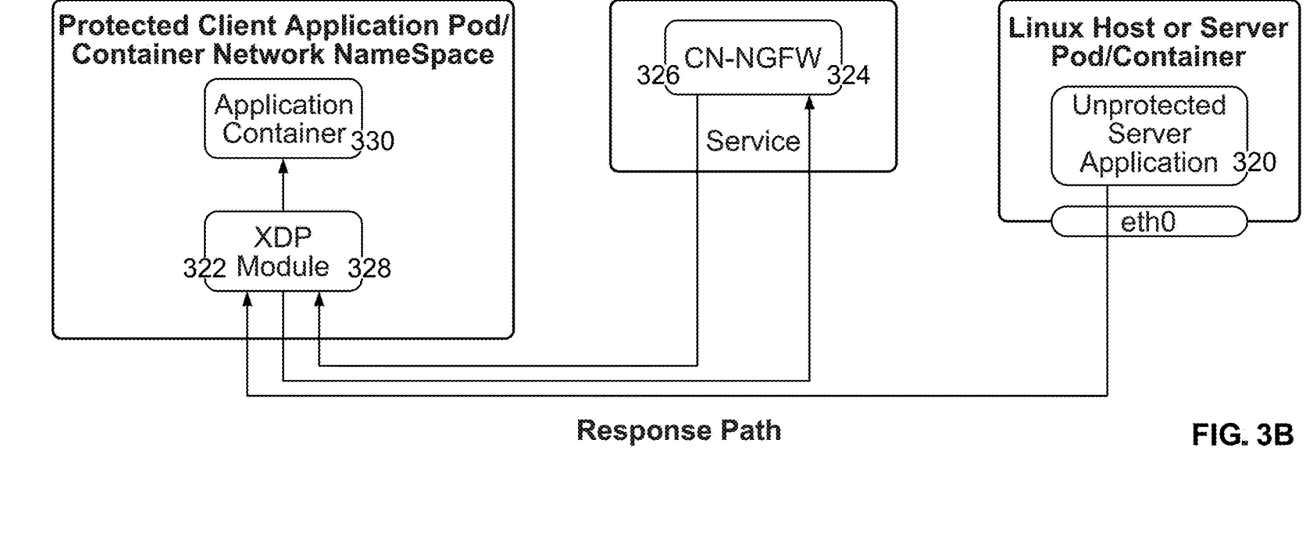
FIG. 3B is a functional block diagram of a system architecture for implementing a response path for providing distributed traffic steering and enforcement for a security solution in a Kubernetes environment in accordance with some embodiments.

FIG. 3B is a functional block diagram of a system architecture for implementing a response path for providing distributed traffic steering and enforcement for a security solution in a Kubernetes environment in accordance with some embodiments.

Referring to FIG. 3B, at stage 320, the server responds to the client. At stage 322, the response is intercepted by the XDP eBPF module in the client network namespace (e.g., Protected client application Pod/Container Network NameSpace as shown in FIG. 3B), and the packet is encapsulated and addressed to be rerouted/sent to the firewall. At stage 324, the firewall receives the packet, and the firewall detects that the packet is an encapsulated packet so it applies TCI to inspect the packet. At stage 326, the firewall swaps the source/destination (src/dst) information in the packet header and sends the packet back to the source (client application). At stage 328, on the client, the packet is intercepted at the eBPF XDP layer (i.e., before the Linux networking stack), and the packet is decapsulated and as the destination is the client, it is forwarded to the client application (e.g., the Application container as shown in FIG. 3A). At stage 330, the packet arrives at the client destination.

In an example implementation, the control points (e.g., XDP control points) can be extended to implement offloading at the enforcement point, in which offloading can be implemented as similarly described herein. As an example, the flow (e.g., an elephant flow or another type of flow to be offloaded based on the offload policy) can be offloaded to a SmartNIC, software executed on a Network Interface Card (NIC), and/or a network device, such as a network router and/or network switch as similarly described above.

For example, the control points (e.g., XDP control points) can also be extended to apply "block" policy at the application. For example, this eliminates the need to send traffic for flows to the firewall, whereas control packets can still be sent to the firewall for processing.

As another example, various additional functionality of the firewall can also be distributed to the eBPF modules for improved efficiency and scalability.

As yet another example, selective decisions on the traffic path can be performed such as sending the packet to the firewall or determining not to send the packet to the firewall.

The disclosed techniques for providing distributed traffic steering and enforcement for a security solution can similarly be implemented in various other computing environments as will now be apparent to one of ordinary skill in the art in view of the disclosed embodiments.

Figure 4A:
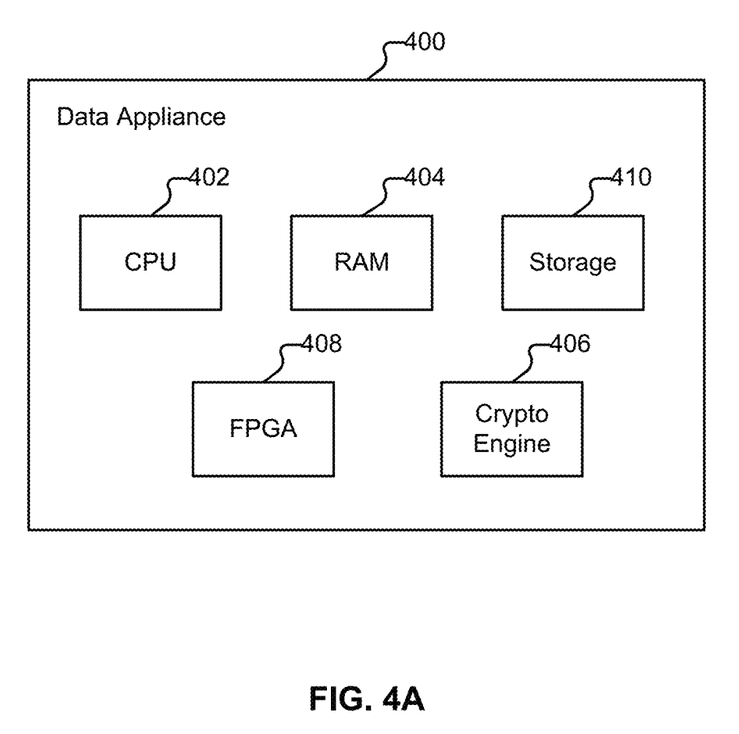
FIG. 4A is a functional diagram of an embodiment of a data appliance.

An embodiment of data appliance 400 is shown in FIG. 4A. The example shown is a representation of physical components that can be included in network gateway 400 if the network gateway (e.g., for a NGFW/firewall/security platform) is implemented as a data appliance, in various embodiments. Specifically, the data appliance includes a high-performance multi-core Central Processing Unit (CPU) 402 and Random Access Memory (RAM) 404. The data appliance also includes a storage 410 (such as one or more hard disks or solid-state storage units). In various embodiments, the data appliance stores (whether in RAM 404, storage 410, and/or other appropriate locations) information used in monitoring an enterprise network and implementing the disclosed techniques. Examples of such information include application identifiers, content identifiers, user identifiers, requested URLs, IP address mappings, policy and other configuration information, signatures, hostname/URL categorization information, malware profiles, and machine learning models. The data appliance can also include one or more optional hardware accelerators. For example, the data appliance can include a cryptographic engine 406 configured to perform encryption and decryption operations, and one or more Field Programmable Gate Arrays (FPGAs) 408 configured to perform matching, act as network processors, and/or perform other tasks.

Functionality described herein as being performed by the data appliance can be provided/implemented in a variety of ways. For example, the data appliance can be a dedicated device or set of devices. The functionality provided by the data appliance can also be integrated into or executed as software on a general purpose computer, a computer server, a gateway, and/or a network/routing device. In some embodiments, at least some services described as being provided by the data appliance are instead (or in addition) provided to a client device (e.g., an endpoint device, such as a laptop, smart phone, etc.) by software executing on the client device.

Whenever the data appliance is described as performing a task, a single component, a subset of components, or all components of the data appliance may cooperate to perform the task. Similarly, whenever a component of the data appliance is described as performing a task, a subcomponent may perform the task and/or the component may perform the task in conjunction with other components. In various embodiments, portions of the data appliance are provided by one or more third parties. Depending on factors such as the amount of computing resources available to the data appliance, various logical components and/or features of the data appliance may be omitted, and the techniques described herein adapted accordingly. Similarly, additional logical components/features can be included in embodiments of the data appliance as applicable. One example of a component included in the data appliance in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on.

The disclosed system processing architecture can be used with different types of clouds in different deployment scenarios, such as the following: (1) public cloud; (2) private cloud on-premises; and (3) inside high-end physical firewalls. Some processing power can be allocated to execute a private cloud (e.g., using the management plane (MP) in the Palo Alto Networks PA-5200 Series firewall appliances).

Figure 4B:
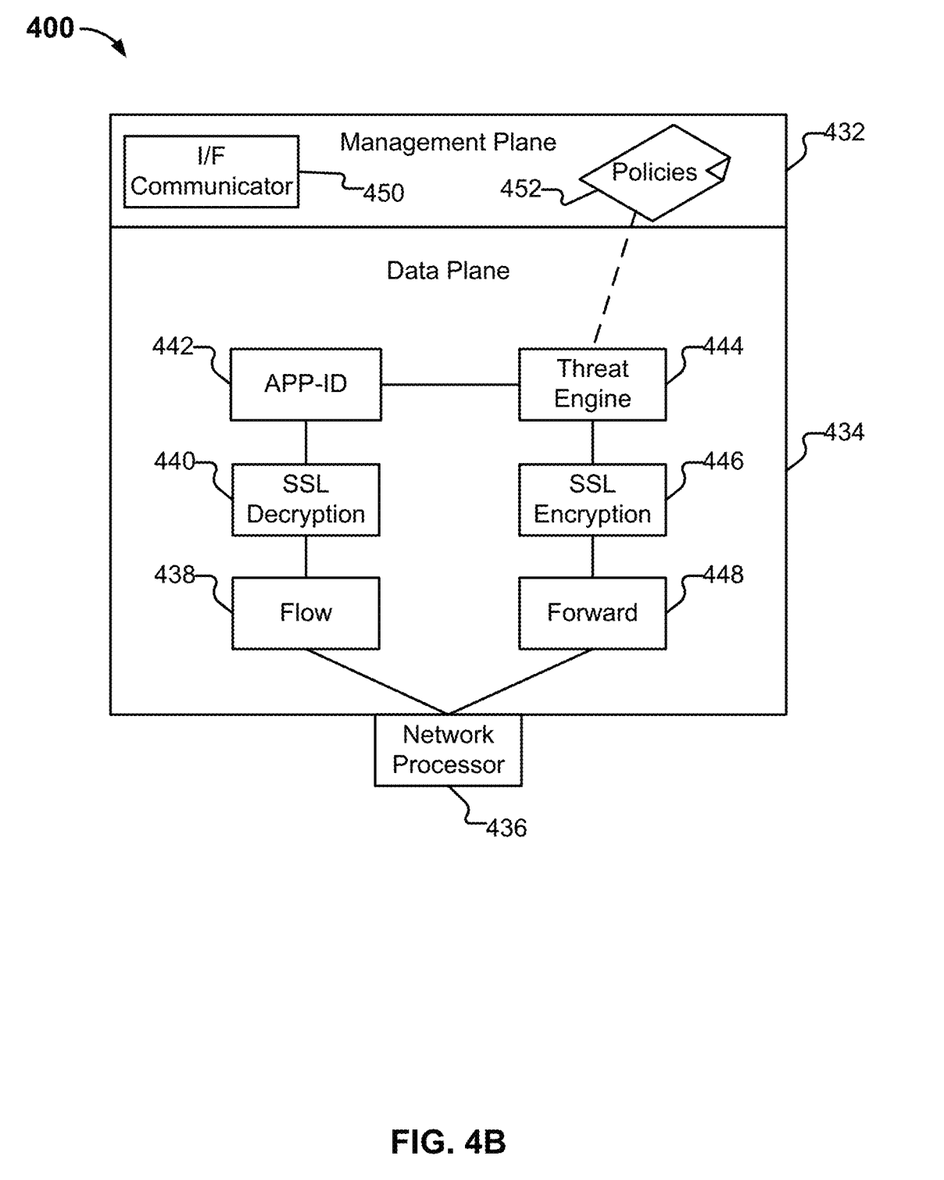
FIG. 4B is a functional diagram of logical components of an embodiment of a data appliance.

FIG. 4B is a functional diagram of logical components of an embodiment of a data appliance. The example shown is a representation of logical components that can be included in network gateway 400 in various embodiments. Unless otherwise specified, various logical components of network gateway 400 are generally implementable in a variety of ways, including as a set of one or more scripts (e.g., written in Java, python, etc., as applicable).

As shown, network gateway 400 comprises a firewall, and includes a management plane 432 and a data plane 434. The management plane is responsible for managing user interactions, such as by providing a user interface for configuring policies and viewing log data. The data plane is responsible for managing data, such as by performing packet processing and session handling.

Network processor 436 is configured to receive packets from client devices and provide them to data plane 434 for processing. Whenever flow module 438 identifies packets as being part of a new session, it creates a new session flow. Subsequent packets will be identified as belonging to the session based on a flow lookup. If applicable, SSL decryption is applied by SSL decryption engine 440. Otherwise, processing by SSL decryption engine 440 is omitted. Decryption engine 440 can help network gateway 400 inspect and control SSL/TLS and SSH encrypted traffic, and thus help to stop threats that might otherwise remain hidden in encrypted traffic. Decryption engine 440 can also help prevent sensitive content from leaving an enterprise/secured customer's network. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 442 is configured to determine what type of traffic a session involves. As one example, application identification engine 442 can recognize a GET request in received data and conclude that the session requires an HTTP decoder. In some cases, e.g., in a web browsing session, the identified application can change, and such changes will be noted by network gateway 400. For example, a user may initially browse to a corporate Wiki (classified based on the URL visited as "Web Browsing—Productivity") and then subsequently browse to a social networking site (classified based on the URL visited as "Web Browsing—Social Networking"). Different types of protocols have corresponding decoders.

Based on the determination made by application identification (APP-ID) engine 442, the packets are sent, by threat engine 444, to an appropriate decoder configured to assemble packets (which may be received out of order) into the correct order, perform tokenization, and extract out information. Threat engine 444 also performs signature matching to determine what should happen to the packet. As needed, SSL encryption engine 446 can re-encrypt decrypted data. Packets are forwarded using a forward module 448 for transmission (e.g., to a destination).

As also shown in FIG. 4B, policies 452 are received and stored in management plane 432. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 450 is provided for management communications (e.g., via (REST) APIs, messages, or network protocol communications or other communication mechanisms).

Figure 5:
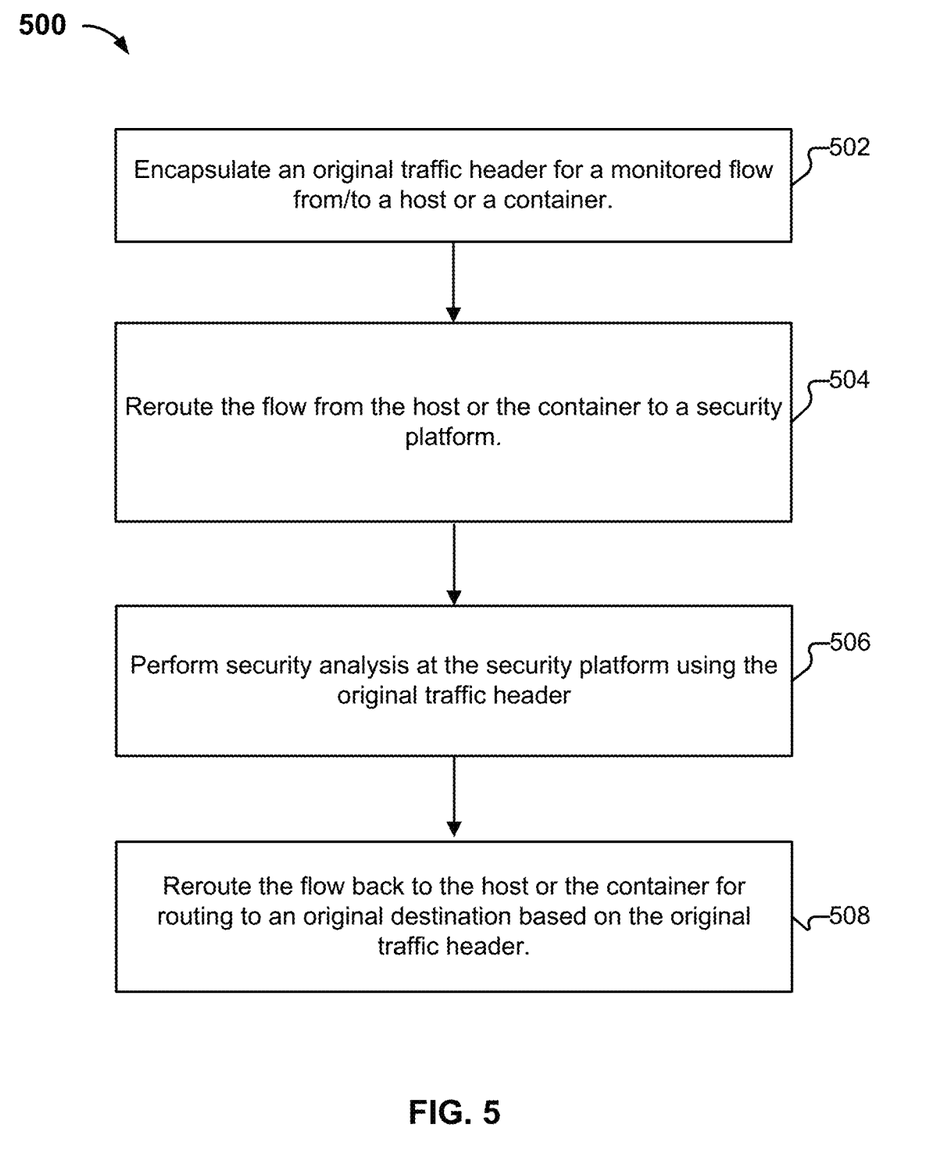
FIG. 5 is a flow diagram illustrating a process for providing distributed traffic steering and enforcement for a security solution in accordance with some embodiments.

Example Processes for Providing Distributed Traffic Steering and Enforcement for Security Solutions FIG. 5 is a flow diagram illustrating a process for providing distributed traffic steering and enforcement for a security solution in accordance with some embodiments. In one embodiment, process 500 is performed using the system architectures described above (e.g., such as described above with respect to FIGS. 1-4B).

The process begins at 502 when encapsulating an original traffic header for a monitored flow from/to a host or a container is performed, such as similarly described above with respect to FIGS. 2A-B and 3A-B.

At 504, rerouting the flow from the host or the container to a security platform (e.g., of a security service) is performed, such as similarly described above with respect to FIGS. 2A-B and 3A-B.

At 506, performing security analysis at the security platform using the original traffic header is performed, such as similarly described above with respect to FIGS. 2A-B and 3A-B.

At 508, rerouting the flow back to the host or the container for routing to an original destination based on the original traffic header is performed, such as similarly described above with respect to FIGS. 2A-B and 3A-B.

Figure 6:
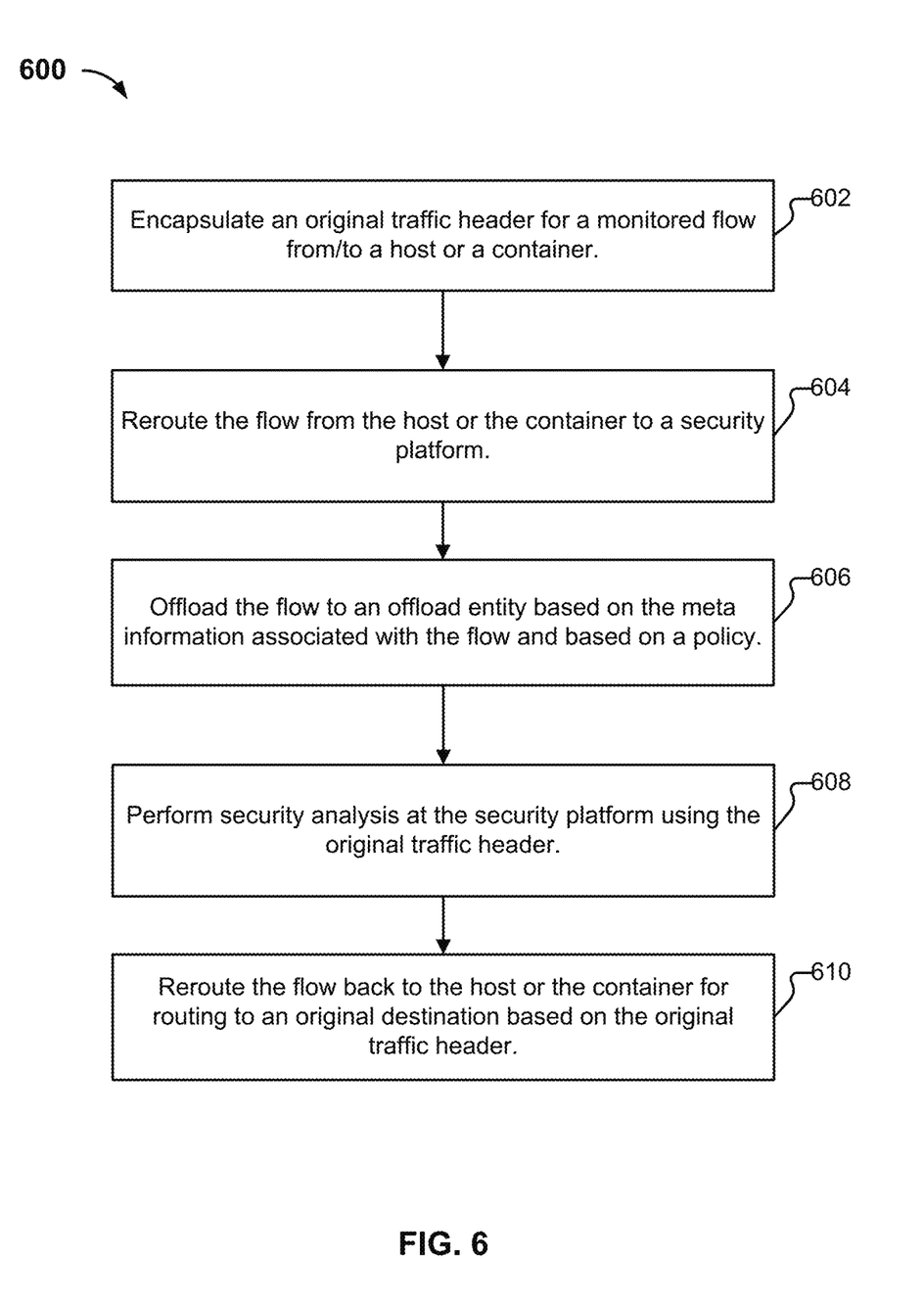
FIG. 6 is another flow diagram illustrating a process for providing distributed traffic steering and enforcement for a security solution in accordance with some embodiments.

FIG. 6 is another flow diagram illustrating a process for providing distributed traffic steering and enforcement for a security solution in accordance with some embodiments. In one embodiment, process 600 is performed using the system architectures described above (e.g., such as described above with respect to FIGS. 1-4B).

The process begins at 602 when encapsulating an original traffic header for a monitored flow from/to a host or a container is performed, such as similarly described above with respect to FIGS. 2A-B and 3A-B.

At 604, rerouting the flow from the host or the container to a security platform (e.g., of a security service) is performed, such as similarly described above with respect to FIGS. 2A-B and 3A-B.

At 606, offloading the flow to an offload entity based on the meta information associated with the flow and based on a policy is performed, such as similarly described above and as disclosed in co-pending U.S. patent application Ser. No. 17/246,160, entitled DISTRIBUTED OFFLOAD LEVERAGING DIFFERENT OFFLOAD DEVICES, filed Apr. 30, 2021, which is incorporated herein by reference for all purposes. For example, the flow (e.g., an elephant flow or another type of flow to be offloaded based on the offload policy) can be offloaded to a SmartNIC, software executed on a Network Interface Card (NIC), and/or a network device, such as a network router and/or network switch as similarly described above. Also, session statistics associated with the flow can be received from the offload entity (e.g., after the flow is closed/completed).

At 608, performing security analysis at the security platform using the original traffic header is performed, such as similarly described above with respect to FIGS. 2A-B and 3A-B.

At 610, rerouting the flow back to the host or the container for routing to an original destination based on the original traffic header is performed, such as similarly described above with respect to FIGS. 2A-B and 3A-B.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
a processor configured to:
encapsulate an original traffic header for a monitored flow from/to a host or a container;
reroute the flow from the host or the container to a security platform of a security service;
perform security analysis at the security platform using the original traffic header; and
reroute the flow back to the host or the container for routing to an original destination based on the original traffic header; and
a memory coupled to the processor and configured to provide the processor with instructions.

2. The system recited in claim 1, wherein the security platform includes a firewall, wherein the flow is determined to be a new flow at the firewall of the security service, and wherein meta information extracted from the flow includes an application identification associated with the flow.

3. The system recited in claim 1, wherein meta information extracted from the flow includes an application identification associated with the flow determined using deep packet inspection.

4. The system recited in claim 1, wherein the flow is offloaded to an offload entity, and wherein the offload entity includes a Smart Network Interface Card (SmartNIC).

5. The system recited in claim 1, wherein the flow is offloaded to an offload entity, and wherein the offload entity is implemented in software executed on a network interface card (NIC).

6. The system recited in claim 1, wherein the flow is offloaded to an offload entity, and wherein the offload entity includes a network router or a network switch.

7. The system recited in claim 1, wherein the security service is implemented using a container-based computing environment.

8. The system recited in claim 1, wherein the security service is a cloud-based security service.

9. The system recited in claim 1, wherein the security service is a cloud-based security service that is provided using a public cloud service provider.

10. The system recited in claim 1, wherein the security service is a cloud-based security service that is provided using a plurality of public cloud service providers.

11. The system recited in claim 1, wherein the processor is further configured to:
offload the flow to an offload entity based on meta information associated with the flow and based on a policy; and
receive session statistics associated with the flow from the offload entity.

12. A method, comprising:
encapsulating an original traffic header for a monitored flow from/to a host or a container;
rerouting the flow from the host or the container to a security platform of a security service;
performing security analysis at the security platform using the original traffic header; and rerouting the flow back to the host or the container for routing to an original destination based on the original traffic header.

13. The method of claim 12, wherein the security platform includes a firewall, wherein the flow is determined to be a new flow at the firewall of the security service, and wherein meta information extracted from the flow includes an application identification associated with the flow.

14. The method of claim 12, wherein meta information extracted from the flow includes an application identification associated with the flow determined using deep packet inspection.

15. The method of claim 12, wherein the flow is offloaded to an offload entity, and wherein the offload entity includes a Smart Network Interface Card (SmartNIC).

16. The method of claim 12, wherein the flow is offloaded to an offload entity, and wherein the offload entity is implemented in software executed on a network interface card (MC).

17. The method of claim 12, wherein the flow is offloaded to an offload entity, and wherein the offload entity includes a network router or a network switch.

18. The method of claim 12, further comprising:
offloading the flow to an offload entity based on meta information associated with the flow and based on a policy; and
receiving session statistics associated with the flow from the offload entity.

19. A non-transitory computer readable storage medium comprising computer instructions for:
encapsulating an original traffic header for a monitored flow from/to a host or a container;
rerouting the flow from the host or the container to a security platform of a security service;
performing security analysis at the security platform using the original traffic header; and
rerouting the flow back to the host or the container for routing to an original destination based on the original traffic header.

20. The computer program product recited in claim 19, wherein the security platform includes a firewall, wherein the flow is determined to be a new flow at the firewall of the security service, and wherein meta information extracted from the flow includes an application identification associated with the flow.

* * * * *